United States Patent [19]

Jenkins

[11] Patent Number: 5,302,331
[45] Date of Patent: Apr. 12, 1994

[54] WASTE TREATMENT PROCESS

[76] Inventor: Robert E. Jenkins, 27049 155th St., Leavenworth, Kans. 86048

[21] Appl. No.: 982,968

[22] Filed: Nov. 30, 1992

[51] Int. Cl.⁵ .................................................. B28B 1/00
[52] U.S. Cl. .................................. 264/115; 106/15.05; 106/624; 106/641; 106/697; 106/737; 106/757; 264/122; 264/333; 264/DIG. 69
[58] Field of Search .............. 264/333, 140, 115, 122, 264/DIG. 69; 106/697, 737, 672, 757, 641, 624, 15.05

[56] References Cited

U.S. PATENT DOCUMENTS

| | | | |
|---|---|---|---|
| 3,734,988 | 5/1973 | Aintablian | 106/697 X |
| 3,819,456 | 6/1974 | Enfield | 106/697 X |
| 3,892,706 | 7/1975 | Jetzer | 106/697 X |
| 4,028,130 | 6/1977 | Webster | 106/697 |
| 4,124,405 | 11/1978 | Quienot | 106/697 |
| 4,600,514 | 7/1986 | Conner | 210/751 |
| 4,859,367 | 8/1989 | Davidovits | 264/333 X |
| 4,931,192 | 6/1990 | Covington et al. | 210/751 |
| 5,019,310 | 5/1991 | Kobayashi | 264/122 |
| 5,075,057 | 12/1991 | Hoedl | 264/122 X |

FOREIGN PATENT DOCUMENTS 2701385  7/1978  Fed. Rep. of Germany ...... 106/697

*Primary Examiner*—Karen Aftergut
*Attorney, Agent, or Firm*—S. Michael Bender

[57] ABSTRACT

A process for recycling household waste, garbage or trash into useful articles including in one preferred embodiment the steps of collecting the waste material, feeding the waste material into a pulverizer to convert the material to a powdery mass, adding water to the mass to form a slurry, adding a binder to the slurry to inhibit bacteriological growth, pouring or otherwise forming the slurry into a useful shape such as a block, or sheet, and allowing the formed shape to air dry under relatively low humidity. The resulting useful article may then be used as a building block, wall board, ceiling tile and so on. In an alternative example, the binder is added directly to the pulverized waste material to produce a useful article such as a flexible roof shingle.

1 Claim, No Drawings

WASTE TREATMENT PROCESS

BACKGROUND OF THE INVENTION

1. Field of the Invention

The present invention relates generally to waste treatment processes, and more particularly, to a waste treatment process for recycling household garbage waste or trash into useful articles.

2. Description of the Prior Art

Household garbage, trash or waste conventionally is collected and transported to a landfill. Such landfills are expensive, potentially toxic to the environment and do not afford any opportunity to recycle the waste material and conserve valuable resources. While attempts have been made to reclaim and recycle garbage, such methods typically employ relatively elaborate and expensive plants for separating the waste into its various constituent parts. For example, magnetic assemblies are employed to extract ferrous metal waste which may then be returned to a metallurgical facility for remelting. A need exists for a relatively simple, cost effective method for recycling household waste, garbage or trash without laborious techniques for separating the waste material into its constituent parts, and then separately treating each part. This need is met by the new and improved waste treatment process of the present invention as will be made apparent from the following description thereof. Other advantages of the present invention over the prior art also will be rendered evident.

SUMMARY OF THE INVENTION

To achieve the foregoing and other advantages, the present invention, briefly described, provides a process for recycling household waste, garbage or trash into useful articles comprising in one preferred embodiment the steps of collecting the waste material, feeding the waste material into a pulverizer to convert the material to a powdery mass, adding water to the mass to form a slurry, adding a binder to the slurry to inhibit bacteriological growth, pouring or otherwise forming the slurry into a useful shape such as a block, or sheet, and allowing the formed shape to air dry under relatively low humidity. The resulting useful article may then be used as a building block, wall board, ceiling tile and so on. In an alternative example, the binder is added directly to the pulverized waste material to produce a useful article such as a flexible roof shingle.

The above brief description sets forth rather broadly the more important features of the present invention in order that the detailed description thereof that follows may be better understood, and in order that the present contributions to the art may be better appreciated. There are, of course, additional features of the invention that will be described hereinafter and will form the subject matter of the claims appended hereto.

In this respect, before explaining the preferred embodiments of the invention in more detail below, it is to be understood that the invention is not limited in its application to the details of the methods, processes, or products made thereby as set forth in the following more detailed description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved waste treatment process which has all of the advantages of the prior art and none of the disadvantages.

It is another object of the present invention to provide a new and improved waste treatment process which may be easily and efficiently manufactured and marketed.

An even further object of the present invention is to provide a new and improved waste treatment process which is susceptible of a low cost of manufacture with regard to both materials and labor, and which accordingly is then susceptible of low prices of sale to the consuming public, thereby making such waste treatment process available to the buying public.

Still yet a further object of the present invention is to provide a new and improved waste treatment process adapted to treat household waste, garbage or trash without first separating the waste material into its constituent parts.

It is still a further object of the present invention to provide a new and improved waste treatment process adapted to recycle household waste materials into useful articles and wherein the process is relatively simple, energy conserving, and low in cost.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the following detailed description of the preferred embodiments of the invention.

DESCRIPTION OF THE PREFERRED EMBODIMENT

In general terms, the new and improved waste treatment process of the present invention contemplates the use and treatment of common household waste materials without first separating the waste into its constituent parts and without pre-treating the waste to remove any part or portion thereof. As used herein the term "waste material(s)" means anything discarded in a garbage can, refuse container or the like, i.e. intended to be "thrown out", and may include, but is not limited to articles of all kind made of plastic, rubber, wood, metal, glass, cardboard, fabric, paper goods, leftover foodstuffs of all kind, and so on. The term "waste" also may be used synonymously herein with the terms "garbage," "trash," or "refuse."

In accordance with the method of the invention, common household waste material in its "as is" state is fed into a grinder or pulverizer where it is ground into a powdery or flaky mass. The pulverizer may be any type of conventional device capable of breaking the waste material into finely divided particles preferably in the range of about ⅛ to about ½ inches. A suitable exemplary device is a hammer mill such as is commercially available from John Deere & Co., and which may be connected to a conventional gasoline or diesel internal combustion engine, or even to an electric motor. The hammer mill comprises a rotatable drum and a series of sharp steel blades rotating inside the drum. Raw garbage placed inside the drum will be turned into a powdery mass of finely divided particles in from about 3 to about 5 minutes having a particle size in the range of about 0.125 inches to about 0.5 inches with the pulverized raw garbage mass being passed through a screen to a discharge hopper.

The powdery mass of raw garbage then is removed from the hammer mill hopper and transferred to a suitable mixing container where in accordance with one preferred embodiment of the invention it is turned into a slurry by adding water while simultaneously slowing agitating the mix with a suitable implement. Enough water is added to produce a freely flowable slurry of smooth consistency.

In order to inhibit the growth of bacteria which may be present in the raw garbage and to provide a suitable binder for the composition, a biological fixing agent is added to the slurry. The preferred agent is lime (calcium carbonate) which is readily available in easy to handle powder form and is low in cost. Other materials in lieu of lime or in addition to lime may be used for this purpose however, largely depending upon the nature of the useful article or product to be produced by the process of the invention. For example, grout, wood putty, adhesives, gypsum or portland cement may each be used instead of or in combination with lime or each of the others to provide a binder and a material which inhibits bacteriological growth. A particularly preferred combination is lime, portland cement, and sand which may be added to the slurry in varying proportions to produce an end product useful as a building or paving block as will be described in further detail below.

After the addition of the binder which serves as the bacteriological control agent, other filler materials may be added to the slurry in order to give the final product certain desired properties. For example, if it desired to produce concrete-like building blocks, which require relatively high strength, gravel may be added to the portland cement and sand additive, and the relative amount of the portland cement increased. Similarly, if it is desired to produce an article which does not require high strength or impact resistance, the portland cement additive and sand, etc. may be dispensed with. A ceiling tile, for example, may be made in accordance with the invention by adding lime and gypsum to the slurry.

In every case, upon the addition of the binder and/or other filler ingredients, the slurry is continually slowly agitated to disperse the filler materials and produce a composition having an even consistency.

The slurry next is poured into a suitable mold or other forming device such as an extruder, to form a useful shape and allowed to dry in an environment of low humidity (e.g. in a room preferably containing air-conditioned or dehumidified air). Preferably, a low speed fan is utilized to move air over the mold to accelerate drying.

After drying, the finished product comprises a solid article having the pulverized waste and other filler materials dispersed therethrough. The product may then be recycled as a building block, insulation board, roofing shingle or any other useful article as desired. Use of such articles would, in turn, obviate an environmentally damaging repository for the shredded and harmlessly rendered garbage or waste material entrained therein.

In certain applications, it is not even required to form a slurry of pulverized waste and water. Thus, for example, the solid pulverized garbage may be combined directly with an asphalt paste or polymeric resinous material to form a flexible sheeting product capable, say, of being used as a roofing shingle.

The following Examples further illustrate the preferred embodiments of the invention, but are not to be construed as limiting.

EXAMPLE 1

Building blocks were produced from recycled household garbage in the following manner. A predetermined quantity of household garbage or waste was pulverized in a hammer mill for 5 minutes to produce a mass of powdery waste material. Ten (10) parts of the shredded waste material was placed in an aluminum bin, and 10 parts of water added while the mix was slowly agitated by hand using a trowel to form a slurry. One (1) part of powdered lime (calcium carbonate), 3 parts of portland cement, and 2 parts of sand were added to the slurry under continuing conditions of slow hand agitation. The resulting mix was poured into conventional bread pans (2"×4"×8") serving as molds to produce rectangular blocks. The molds and their contents were placed in an open oven maintained at 80 degrees Fahrenheit for 2 hours. The resulting blocks were removed from their corresponding molds and observed to resemble cement building blocks in every way. The blocks were considered suitable for use with conventional mortar to construct retaining walls, highway barriers, patio blocks and so on.

EXAMPLE 2

Sheets suitable for use as wallboard were produced from recycled household garbage in the following manner. A predetermined quantity of household garbage or waste was pulverized in a hammer mill for 5 minutes to produce a mass of powdery waste material. Four (4) parts of the shredded waste material was placed in an aluminum bin, and 1 part of water added while the mix was slowly agitated by hand using a trowel to form a slurry. One (1) part of powdered lime (calcium carbonate), and 2 parts of powdered gypsum were added to the slurry under continuing conditions of slow hand agitation. The resulting mix was poured into conventional bread pans (2"×4"×8") serving as molds to produce rectangular blocks. The molds and their contents were placed in an open oven maintained at 80 degrees Fahrenheit for 2 hours. The resulting blocks were removed from their corresponding molds and observed to resemble gypsum wall board without the layers of paper on its opposed sides.

EXAMPLE 3

Sheets suitable for use as ceiling tile were produced from recycled household garbage in the following manner. A predetermined quantity of household garbage or waste was pulverized in a hammer mill for 5 minutes to produce a mass of powdery waste material. Eight (8) parts of the shredded waste material was placed in an aluminum bin, and 1 part of water added while the mix was slowly agitated by hand using a trowel to form a slurry. One (1) part of powdered lime (calcium carbonate), and 2 parts of powdered gypsum were added to the slurry under continuing conditions of slow hand agitation. The resulting mix was poured into conventional bread pans (2"×4"×8") serving as molds to produce rectangular blocks. The molds and their contents were placed in an open oven maintained at 80 degrees Fahrenheit for 2 hours. The resulting sheets were removed from their corresponding molds and observed to resemble ceiling tile material.

EXAMPLE 4

Flexible roofing shingles were produced from recycled household garbage in the following manner. A predetermined quantity of household garbage or waste was pulverized in a hammer mill for twenty minutes to produce a mass of powdery waste material. Four (4) parts of the shredded waste material was placed in an aluminum bin, and 1 part asphalt roofing cement added slowly as the mix was agitated by hand using a trowel. The resulting mix was transferred to conventional bread pans (2"×4"×8") serving as molds to produce rectangular sheets. The molds and their contents were placed in an open oven maintained at 80 degrees Fahrenheit for 2 hours. The resulting sheets were removed from their corresponding molds and observed to flexible roofing shingles.

While the present invention has been fully described above with particularity and detail in connection with what is presently deemed to be the most practical and preferred example(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A process for recycling household waste materials comprising the following steps:
   (a) grinding a predetermined quantity of said waste materials in an untreated condition into finely divided particles varying in size in a range of about 0.125 inches to about 0.5 inches to form a powdery mass,
   (b) adding water to said powdery mass to form a slurry,
   (c) preparing a mixture of calcium carbonate, portland cement and sand to form a binder for inhibiting bacteriological growth,
   (d) adding said binder to said slurry to form a mixture of said binder and said slurry
   (e) placing said slurry and binder mixture into a shape forming device to form a desired shape, and
   (f) drying said desired shape in said shape forming device in an environment maintained at a temperature of 80 degrees Fahrenheit for two hours.

* * * * *